United States Patent
Fujimoto et al.

(10) Patent No.: US 7,233,485 B2
(45) Date of Patent: Jun. 19, 2007

(54) SOLID ELECTROLYTIC CAPACITOR AND METHOD OF MANUFACTURING THE SAME

(75) Inventors: Kazumasa Fujimoto, Saga-gun (JP); Sachiko Yoshino, Karatsu (JP)

(73) Assignees: Sanyo Electric Co., Ltd., Moriguchi-shi (JP); Saga Sanyo Industries Co., Ltd., Kishima-gun (JP)

( * ) Notice: Subject to any disclaimer, the term of this patent is extended or adjusted under 35 U.S.C. 154(b) by 0 days.

(21) Appl. No.: 11/350,734

(22) Filed: Feb. 10, 2006

(65) Prior Publication Data

US 2006/0179625 A1    Aug. 17, 2006

(30) Foreign Application Priority Data

Feb. 14, 2005  (JP)  ............... 2005-036092

(51) Int. Cl.
*H01G 9/04* (2006.01)
*H01G 4/228* (2006.01)
*H01G 9/10* (2006.01)

(52) U.S. Cl. ............... 361/531; 361/533; 361/540

(58) Field of Classification Search ............... 361/531, 361/533, 540
See application file for complete search history.

(56) References Cited

U.S. PATENT DOCUMENTS 4,068,291 A * 1/1978 Pierpont ............... 361/533

FOREIGN PATENT DOCUMENTS

JP    06-310381    11/1994
JP    2003309041 A  * 10/2003

* cited by examiner

*Primary Examiner*—Eric W. Thomas
(74) *Attorney, Agent, or Firm*—Westerman, Hattori, Daniels & Adrian, LLP.

(57) ABSTRACT

A solid electrolytic capacitor includes: a capacitor element including an anode made of a valve metal having an oxide film formed on a surface thereof, a cathode provided with a valve metal, and a separator provided between the anode and the cathode, the anode and the cathode and the separator being wound around together; a solid electrolyte interposed between the anode and the cathode; an anode lead tab having an oxide film formed on a surface thereof and being fixed to the anode; and a cathode lead tab fixed to the cathode. The oxide film of the anode lead tab has a portion the thickness of which is equal to or greater than 75% but less than 100% of the thickness of the oxide film of the anode.

12 Claims, 2 Drawing Sheets

SOLID ELECTROLYTIC CAPACITOR AND METHOD OF MANUFACTURING THE SAME

BACKGROUND OF THE INVENTION

1. Field of the Invention

The present invention relates to a solid electrolytic capacitor comprising a capacitor element including an anode in which an oxide film is formed on a surface of a valve metal, a cathode furnished with a valve metal, and a separator provided between the anode and the cathode, the anode and the cathode and the separator being wound around together, wherein a solid electrolyte is interposed between the anode and the cathode, an anode lead tab having an oxide film formed on a surface thereof is fixed to the anode, and a cathode lead tab is fixed to the cathode. The invention also relates to a method of manufacturing the solid electrolytic capacitor.

2. Description of Related Art

Electrolytic capacitors that make use of valve metals such as tantalum and aluminum are widely used since they are capable of attaining large capacity with small sized. Among the electrolytic capacitors, solid electrolytic capacitors employing conductive polymers such as polypyrroles, polythiophenes, and polyanilines, or TCNQ complex salts as their electrolytes have attracted attention.

A solid electrolytic capacitor of the foregoing type is fabricated in the following manner (see Japanese Published Unexamined Patent Application No. 6-310381).

First, an anode lead tab that has been subjected to a formation process and a cathode lead tab are fixed to an anode that is made of aluminum foil and has been subjected to an etching process and a formation process, and a cathode, respectively. Thereafter, the anode and the cathode are wound around in a cylindrical form with a separator paper interposed therebetween to form a capacitor element. Further, cut edge formation and a heat treatment is carried out for the capacitor element. Next, the capacitor element is immersed in a solution containing an oxidizing agent and a monomer, and thereafter, thermal polymerization is effected, whereby a conductive polymer layer (a solid electrolyte layer) is formed between the anode and the cathode of the capacitor element. Subsequently, the capacitor element is accommodated and secured in an aluminum case, then the aluminum case is sealed, and further an aging process is performed. Lastly, a base plate is inserted to come into contact with the curled surface of the capacitor, and the lead lines of the capacitor are press-worked and bent to form electrode terminals, so that a solid electrolytic capacitor is completed.

Demands for high-withstanding voltage products of the foregoing solid electrolytic capacitors have been escalating in the market. The solid electrolytic capacitors, however, have a problem that they have poorer self-repairing ability against leakage current (LC) than liquid electrolyte-type electrolytic capacitors. To enable such solid electrolytic capacitors to have an increased withstanding voltage, it is necessary that the withstanding voltage of the dielectric oxide film of the anode foil be high (in other words, the formation voltage for the anode foil needs to be high). Moreover, in the manufacturing process, edges of the anode foil need to be subjected to a formation process again for the same reason. It should be noted, however, that the formation of the edges is a typical process for solid electrolytic capacitors and is not a process that is particularly carried out to increase the withstanding voltage.

Normally, cut edge formation, which is carried out during the manufacturing process, is performed with the same formation voltage as the formation voltage for the anode foil. However, if the formation voltage for the cut edge formation exceeds 200 V (especially over 230 V), the cut edge formation becomes unstable when using a conventional anode lead tab (formation voltage: about 160 V), producing corrosion at many locations in the weld part of the anode lead tab. As a result, the LC characteristics of the solid electrolytic capacitor become unstable.

BRIEF SUMMARY OF THE INVENTION

The present invention has been accomplished to resolve such problems as described above, and it is an object of the present invention to provide a solid electrolytic capacitor and a method of manufacturing the capacitor, which are capable of stabilizing LC characteristics by stabilizing cut edge formation and impeding corrosion of a weld part of the anode lead tab.

In order to accomplish the foregoing and other objects, the present invention provides a solid electrolytic capacitor, comprising: a capacitor element comprising an anode made of a valve metal having an oxide film formed on a surface thereof, a cathode provided with a valve metal, and a separator provided between the anode and the cathode, the anode and the cathode and the separator being wound around together; a solid electrolyte interposed between the anode and the cathode; an anode lead tab having an oxide film formed on a surface thereof and being fixed to the anode; and a cathode lead tab fixed to the cathode; wherein the oxide film of the anode lead tab has a portion the thickness of which is equal to or greater than 75% but less than 100% of the thickness of the oxide film of the anode.

The present inventors have found that a cause of the instability of cut edge formation and the corrosion of the weld part of the anode lead tab is that the formation voltage for the anode lead tab is too low with respect to the formation voltage for the cut edge formation. Normally, the formation voltage for the anode lead tab used for a solid electrolytic capacitor is 160 V, so if a voltage exceeding 200 V (particularly exceeding 230 V) is applied in cut edge formation, the anode lead tab itself undergoes the formation greatly, making the cut edge formation instable, and at the same time, a large current flows through the anode lead tab because it undergoes the formation, causing the weld part of the anode lead tab to corrode.

In view of this problem, the anode lead tab is formed at a voltage that is 75% or higher of the formation voltage for the anode formation, in other words, the percentage of the oxide film of the anode lead tab with respect to the thickness of the oxide film of the anode is controlled to be 75% or greater, in order to stabilize cut edge formation (in order to make the solid electrolytic capacitor have an increased withstanding voltage). This allows the cut edge formation to stabilize, and at the same time prevents a large current from flowing through the anode lead tab, impeding the corrosion of the weld part of the anode lead tab, even when the formation voltage in the cut edge formation (which is set at substantially the same voltage as the formation voltage for the anode) is high.

In the forgoing solid electrolytic capacitor, the solid electrolyte may be a polythiophene-based conductive polymer, a polypyrrole-based conductive polymer, a polyaniline-based conductive polymer, or a TCNQ complex salt.

The polythiophene-based conductive polymer, the polypyrrole-based conductive polymer, the polyaniline-based conductive polymer, and the TCNQ complex salt, which are given as merely illustrative examples of the solid electrolyte and are not intended to limit the present invention.

In the forgoing solid electrolytic capacitor, the solid electrolyte may be a polythiophene-based conductive polymer.

In the forgoing solid electrolytic capacitor, the thickness of the oxide film of the anode may be $3.5 \times 10^{-7}$ m or greater, and the thickness of the oxide film of the anode lead tab may be $2.8 \times 10^{-7}$ m or greater.

In the forgoing solid electrolytic capacitor, a portion of the oxide film of the anode lead tab may have substantially the same thickness as the thickness of the oxide film of the anode.

Since the anode lead tab that has been subjected to formation has a portion that comes into contact with a formation solution when the subsequent cut edge formation is performed, that portion is subjected to formation once again in the cut edge formation. Consequently, that portion becomes substantially the same thickness as the thickness of the oxide film of the anode. Nevertheless, even if a portion of the anode lead tab is subjected to formation once again in the cut edge formation, there will be no problem since the difference between the formation voltage in the cut edge formation and the formation voltage in subjecting the anode lead tab to formation is small.

In the forgoing solid electrolytic capacitor, the rated voltage may be 50 V or higher.

The invention is particularly suitable for high withstanding voltage capacitors with a rated voltage of 50 V or higher.

The invention also provides a method of manufacturing a solid electrolytic capacitor, comprising the steps of: performing a formation process to form an oxide film on a surface of a valve metal so as to prepare an anode and to form an oxide film on a surface of an anode lead tab; fixing an anode lead tab to the anode, and a cathode lead tab to a cathode provided with a valve metal, respectively; winding around the anode, the cathode, and a separator provided between the anode and the cathode to prepare a capacitor element; performing an cut edge formation of the capacitor element; and impregnating a solid electrolyte in the capacitor element, wherein, in the step of performing a formation process, the percentage of a formation voltage in preparing the anode lead tab with respect to a formation voltage in preparing the anode is controlled to be 75% or greater.

It is known that the thickness of the thickness of oxide film is proportional to formation voltage. Therefore, the foregoing electrolytic capacitor can be easily manufactured by the above-described method.

It is preferable that the percentage of the formation voltage in preparing the anode lead tab with respect to the formation voltage in preparing the anode be less than 100%. The reason is that if the percentage of the formation voltage in preparing the anode lead tab with respect to the formation voltage in preparing the anode becomes 100% or greater, the formation process power is so large that the thickness of the oxide film is also increased in the anode foil.

In the step of impregnating a solid electrolyte in the foregoing method, the solid electrolyte may be impregnated in the capacitor element by impregnating a monomer into the capacitor and thereafter effecting thermal polymerization.

In the foregoing method, the rated voltage may be 50 V or higher.

The invention is particularly suitable for high withstanding voltage capacitors with a rated voltage of 50 V or higher.

In the foregoing method, the formation voltage in preparing the anode may be 300 V or higher, and the formation voltage in preparing the anode lead tab may be 225 V or higher.

The present invention makes it possible to achieve an advantageous effect that the LC characteristics of the solid electrolytic capacitor can be stabilized by stabilizing the cut edge formation and impeding corrosion of the weld part of the anode lead tab.

DETAILED DESCRIPTION OF THE INVENTION

Figure 1:
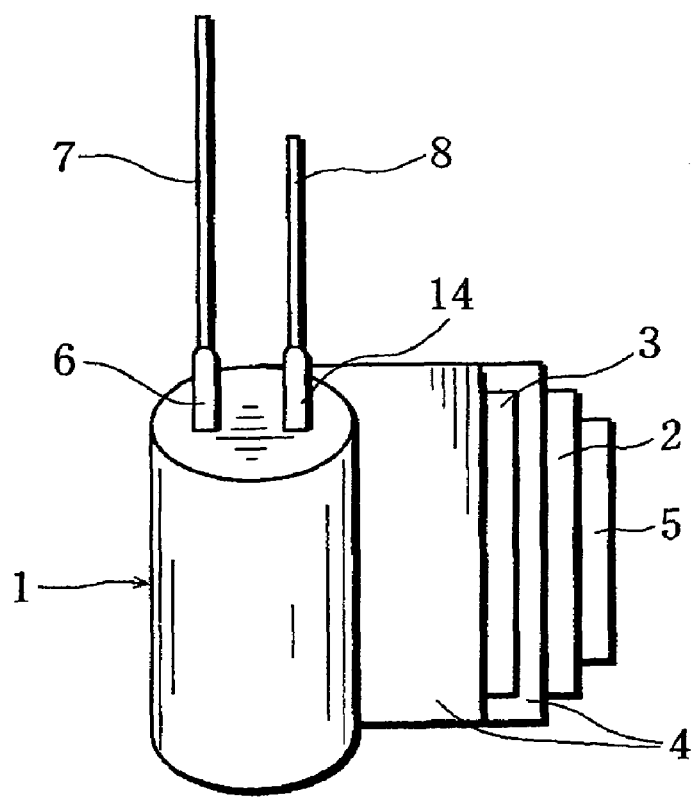
FIG. 1 is a perspective view illustrating a capacitor element used for a solid electrolytic capacitor according one example of the present invention.
Figure 2:
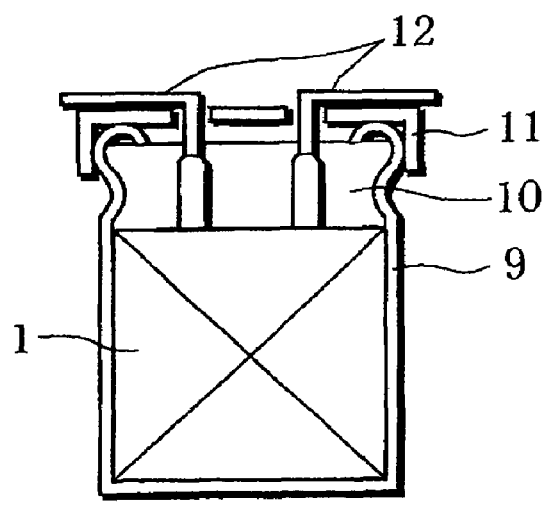
FIG. 2 is a cross-sectional view illustrating the solid electrolytic capacitor according to one example of the present invention.

FIG. 1 is a perspective view illustrating a capacitor element used for a solid electrolytic capacitor according one example of the present invention, and FIG. 2 is a cross-sectional view illustrating the solid electrolytic capacitor according to one example of the present invention.

As illustrated in FIG. 2, a capacitor element 1 is disposed in an aluminum case 9, and a sealing rubber packing 10 is inserted on top of the capacitor element 1. The aluminum case 9 is sealed by reducing its opening laterally and curling it, and a plastic base plate 11 is inserted on top of the seal part. Provided above the base plate 11 are electrode terminals 12, which are formed by press-working and bending later-described cathode lead wire 8 and anode lead wire 7 that are electrically connected to the cathode 2 and the anode 3, respectively.

The capacitor element 1 comprises, as illustrated in FIG. 1, an anode 3 in which an oxide film is formed on a surface of aluminum foil with rough surfaces, a cathode 2 made of aluminum foil with rough surfaces, and a paper separator 4 provided between the anode 2 and the cathode 3. The anode 2, the cathode 3, and the separator 4 are wound together in a roll form to constitute a cylindrical capacitor element 1, and a fixing tape 5 is bonded to an edge part of the capacitor element 1 that has been wound around. A polythiophene-based conductive polymer layer is formed between the anode 2 and the cathode 3.

Figure 3:
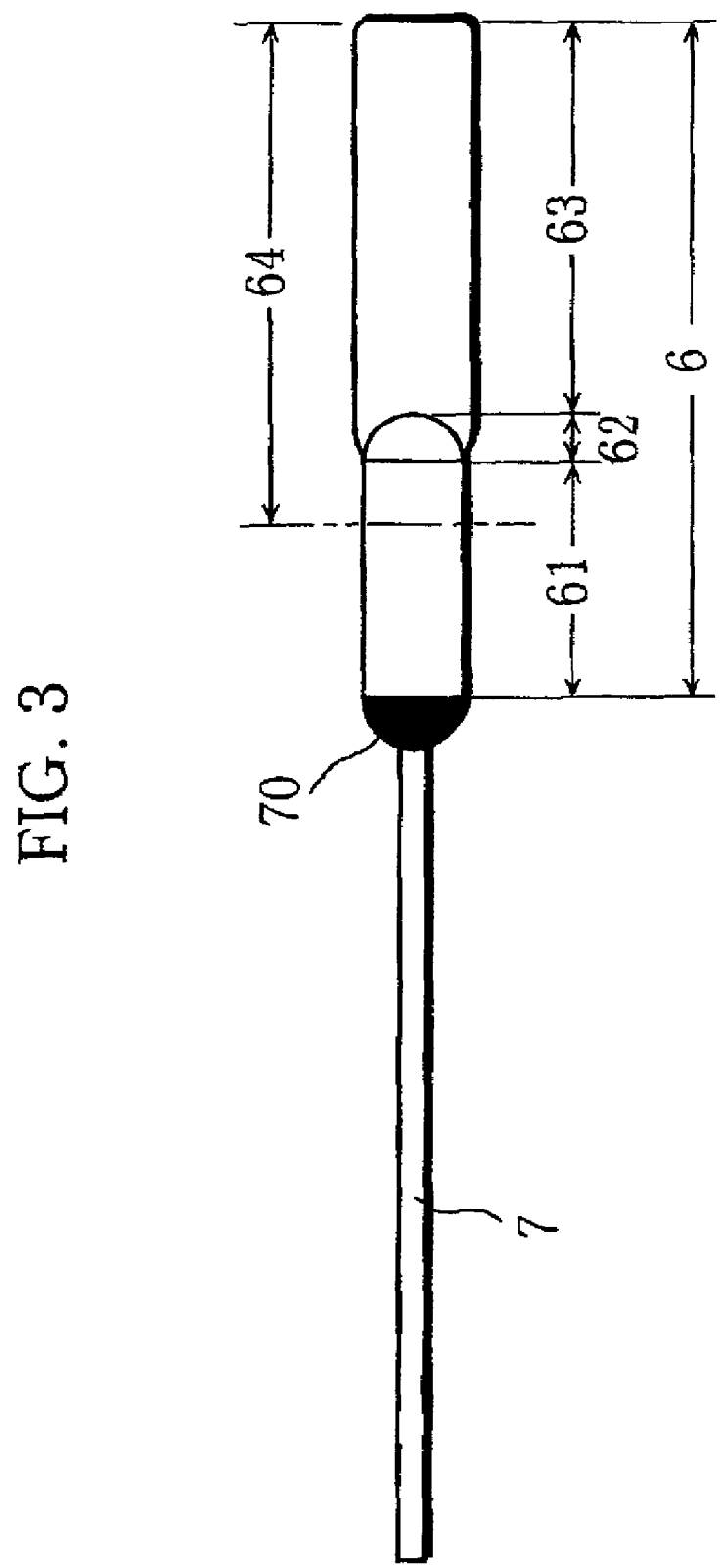
FIG. 3 is a plan view illustrating a cathode lead tab of the solid electrolytic capacitor according to one example of the present invention.

In FIG. 1, reference numeral 6 denotes an anode lead tab, and reference numeral 7 denotes an anode lead wire. Specifically, they have a structure such that, as illustrated in FIG. 3, the anode lead wire 7 is welded to the anode lead tab 6 made of aluminum and composed of a boss portion 61, a rib portion 62, and a flat portion 63. In FIG. 3, reference numeral 70 denotes a weld part. In FIG. 1, reference numeral 14 denotes a cathode lead tab, and reference numeral 8 denoted a cathode lead wire. Their specific structures are similar to those of the anode lead tab 6 and the anode lead wire 7 shown in FIG. 3. However, the cathode lead tab 7 is not subjected to a formation process, unlike the anode lead tab 6.

A solid electrolytic capacitor having the above-described configuration is fabricated in the following manner.

First, a sheet-like aluminum foil that had been cut out from an aluminum sheet is subjected to an etching process. The etching process is performed in order to roughen the surfaces of the aluminum foil and thereby enlarge the surface area so that the capacitance can be increased. Next, the aluminum foil is immersed in a formation solution and a voltage of 250 V is applied thereto (i.e., the formation voltage is set at 250 V), whereby the aluminum is oxidized and an aluminum oxide film (formed film) is formed. Thus, the anode 3 is prepared. Known examples of the formation solution include solutions of phosphates, borates, and adipates, but it is also possible to use solutions of other acid chlorides.

The thickness of the aluminum oxide film is $14 \times 10^{-10}$ m per 1 V of formation voltage (applied voltage) and is proportional to formation voltage, and therefore, the thickness of the aluminum oxide film formed on the anode 3 is expressed by the following equation (1):

$$250 \times 14 \times 10^{-10} \text{ m} = 3.5 \times 10^{-7} \text{ m} \qquad \text{Eq. (1)}$$

In parallel with the above-described process of preparing the anode, an aluminum oxide film (formed film) is formed also for the anode lead tab 6 by applying a voltage also to the anode lead tab 6 (by subjecting the aluminum anode lead tab 6 to a formation process) under the conditions set out below. It should be noted that the applied voltage in this case is 200 V, and therefore the thickness of the aluminum oxide film formed on the anode lead tab 6 is expressed by the following equation (2).

$$200 \times 14 \times 10^{-10} \text{ m} = 2.8 \times 10^{-7} \text{ m} \qquad \text{Eq. (2)}$$

Nevertheless, since a portion 64 of the anode lead tab 6 (the portion that exists on the left of the two-dot chain line in FIG. 3) comes in contact with a formation solution in later-described cut edge formation, the portion 64 is again formed in the cut edge formation, which is carried out at the same voltage (250 V) as the formation voltage for the anode 3. As a consequence, the thickness of the aluminum oxide film in the portion 64 of anode lead tab 6 results in $3.5 \times 10^{-7}$ m, as with the thickness of the aluminum oxide film formed on the anode 3.

Next, the anode lead tab 6 is fixed to the anode 3 by spot facing, and at the same time the cathode lead tab 14 is fixed to the cathode 2 made of aluminum foil.

Thereafter, the anode 3 and the cathode 2 are wound together in a roll form with the separator 4 made of an insulator, and its terminal edge is secured by the tape 5, whereby the capacitor 1 was fabricated. Since the anode 3 is, as described above, prepared by cutting it out from an aluminum sheet, no aluminum oxide film (dielectric oxide film) is formed on the cut edge surface of the anode 3. For this reason, cut edge formation for the capacitor element 1 is carried out with an applied voltage 250 V (the same voltage as the formation voltage for the anode 3) so that an aluminum oxide film is formed also on the cut edge surface of the anode. Thereafter, the capacitor element 1 was heat-treated at 280° C. to stabilize the characteristics of the aluminum oxide film.

Next, the capacitor element 1 is immersed in a butyl alcohol solution containing 3,4-ethylenedioxythiophene as a monomer and ferric p-toluenesulfonate as an oxidizing agent solution, and thereafter thermal polymerization is effected to form a conductive polymer layer between the anode 2 and the cathode 3, whereby the capacitor element 1 is completed.

Thereafter, as illustrated in FIG. 2, the capacitor element 1 prepared in the foregoing manner is accommodated in an aluminum case 9, and a sealing rubber packing 10 is inserted into the aluminum case 9 on top of the capacitor element 1 and fixed. Thereafter, the aluminum case 9 was sealed by laterally reducing the opening and curling it. Finally, after aging is carried out, the base place 11 made of plastic is inserted onto the curled surface of the capacitor, and the electrode terminals 12 are formed by press-working and bending the lead wires 7 and 8 of the capacitor, whereby a solid electrolytic capacitor is fabricated.

The solid electrolytic capacitor thus fabricated has a rated voltage of 50 V, and the outer dimensions of the aluminum case 9 are 10.0 mm in diameter and 8.0 mm in height.

EXAMPLES

Example 1

A solid electrolytic capacitor was fabricated in accordance with the above-described manner.

The solid electrolytic capacitor thus fabricated is hereinafter referred to as a capacitor A1 of the invention.

Example 2

A solid electrolytic capacitor was fabricated in the same manner as in Example 1 except that the applied voltages in the formation processes for the anode 3 (the term "the anode 3" here is intended to include the cut edges of the anode, and this likewise applies to Example 3 and Comparative Examples 1 to 3 below) and the anode lead tab 6 were set at 400 V and 300 V, respectively.

The solid electrolytic capacitor thus fabricated is hereinafter referred to as a capacitor A2 of the invention.

The thickness of the aluminum oxide film formed on the anode 3 is expressed by the following equation (3), and the thickness of the aluminum oxide film formed on the anode lead tab 6 is expressed by the following equation (4).

$$400 \times 14 \times 10^{-10} \text{ m} = 5.6 \times 10^{-7} \text{ m} \qquad \text{Eq. (3)}$$

$$300 \times 14 \times 10^{-10} \text{ m} = 4.2 \times 10^{-7} \text{ m} \qquad \text{Eq. (4)}$$

Example 3

A solid electrolytic capacitor was fabricated in the same manner as in Example 1 except that the applied voltages in the formation processes for the anode 3 and the anode lead tab 6 were set at 450 V and 400 V, respectively.

The solid electrolytic capacitor thus fabricated is hereinafter referred to as a capacitor A3 of the invention.

The thickness of the aluminum oxide film formed on the anode 3 is expressed by the following equation (5), and the thickness of the aluminum oxide film formed on the anode lead tab 6 is expressed by the following equation (6).

$$450 \times 14 \times 10^{-10} \text{ m} = 6.3 \times 10^{-7} \text{ m} \qquad \text{Eq. (5)}$$

$$400 \times 14 \times 10^{-10} \text{ m} = 5.6 \times 10^{-7} \text{ m} \qquad \text{Eq. (6)}$$

Comparative Example 1

A solid electrolytic capacitor was fabricated in the same manner as in Example 1 except that the applied voltages in the formation processes for the anode 3 and the anode lead tab 6 were set at 250 V and 160 V, respectively.

The solid electrolytic capacitor thus fabricated is hereinafter referred to as a comparative capacitor X1.

The thickness of the aluminum oxide film formed on the anode 3 is expressed by the following equation (7), and the thickness of the aluminum oxide film formed on the anode lead tab 6 is expressed by the following equation (8).

$$250 \times 14 \times 10^{-10} \text{ m} = 3.5 \times 10^{-7} \text{ m} \quad \text{Eq. (7)}$$

$$160 \times 14 \times 10^{-10} \text{ m} = 2.24 \times 10^{-7} \text{ m} \quad \text{Eq. (8)}$$

Comparative Example 2

A solid electrolytic capacitor was fabricated in the same manner as in Example 1 except that the applied voltages in the formation processes for the anode 3 and the anode lead tab 6 were set at 400 V and 200 V, respectively.

The solid electrolytic capacitor thus fabricated is hereinafter referred to as a comparative capacitor X2.

The thickness of the aluminum oxide film formed on the anode 3 is expressed by the following equation (9), and the thickness of the aluminum oxide film formed on the anode lead tab 6 is expressed by the following equation (10).

$$400 \times 14 \times 10^{-10} \text{ m} = 5.6 \times 10^{-7} \text{ m} \quad \text{Eq. (9)}$$

$$200 \times 14 \times 10^{-10} \text{ m} = 2.8 \times 10^{-7} \text{ m} \quad \text{Eq. (10)}$$

Comparative Example 3

A solid electrolytic capacitor was fabricated in the same manner as in Example 1 except that the applied voltages in the formation processes for the anode 3 and the anode lead tab 6 were set at 450 V and 300 V, respectively.

The solid electrolytic capacitor thus fabricated is hereinafter referred to as a comparative capacitor X3.

The thickness of the aluminum oxide film formed on the anode 3 is expressed by the following equation (11), and the thickness of the aluminum oxide film formed on the anode lead tab 6 is expressed by the following equation (12).

$$450 \times 14 \times 10^{-10} \text{ m} = 6.3 \times 10^{-7} \text{ m} \quad \text{Eq. (11)}$$

$$300 \times 14 \times 10^{-10} \text{ m} = 4.2 \times 10^{-7} \text{ m} \quad \text{Eq. (12)}$$

Experiment 1

The percentages of occurrence of corrosion in the cut edge formation process were investigated with the capacitors A1 to A3 and the comparative capacitors X1 to X3. The results are shown in Table 1. The number of samples was 20 for each of the capacitors A1 to A3 and the comparative capacitors X1 to X3.

Table 1

The results shown in Table 1 clearly show that no corrosion was observed in the capacitors A1 to A3, while many samples of the comparative capacitors X1 to X3 were observed to have suffered the corrosion. Accordingly, it is demonstrated that the percentage of the film thickness of the aluminum oxide film in the anode lead tab with respect to the film thickness of the aluminum oxide film in the anode (the percentage of the formation voltage for the anode lead tab with respect to the formation voltage for the anode) should be controlled to be 75% or greater.

Experiment 2

The initial LC characteristics were investigated with the capacitors A1 to A3 and the comparative capacitors X1 to X3. The results are shown in Table 2. It should be noted that the number of samples was 20 for each of the capacitors A1 to A3 and the comparative capacitors X1 to X3, and the values reported in Table 2 are average values of the samples.

Table 2

The results shown in Table 2 above clearly demonstrate that the capacitors A1 to A3 of the invention exhibit remarkably improved initial LC characteristics in comparison with those of comparative capacitors X1 to X3. Accordingly, it will be appreciated that the percentage of the film thickness of the aluminum oxide film in the anode lead tab with respect to the film thickness of the aluminum oxide film in the anode (the percentage of the formation voltage for the anode lead tab with respect to the formation voltage for the anode) should be controlled to be 75% or greater.

Variations (1) Although the foregoing embodiments use etched aluminum foil for the base material of the electrodes, it is of course possible to use plane (unetched) aluminum foil.

(2) Although a polythiophene-based conductive polymer was used for the solid electrolyte, this is for illustrative purposes only, and it is of course possible to use a polypyrrole-based conductive polymer, a polyaniline-based conductive polymer, and a TCNQ complex salt.

(3) The formation process for the anode lead tab may be carried out either before or after the preparing of the anode lead tab. In other words, the anode lead tab is formed by punching out a metal sheet made of aluminum and the like, and the formation process may be carried out either before or after the punching out. In addition, although in the foregoing embodiments the formation process is performed only for the anode lead tab, it is of course possible to perform a formation process for the cathode lead tab. When the cathode lead tab that has been subjected to a formation process is used, both the lead tabs can be made in the same manner and therefore productivity can be improved.

(4) The valve metal is not limited to aluminum as noted above but may be tantalum, niobium, and the like.

(5) Although it is not necessary to employ the same voltage in the formation processes for the anode 3 and the cut edge of the anode, it is desirable that both the formation processes be carried out at the same voltage in order to stabilize the cut edge formation and impede the corrosion of the weld part of the weld part of the anode lead tab.

The present invention may be applicable to, for example, surface mounted electronic components in printed circuit boards for electronic devices, such as mobile telephones, notebook computers, and PDAs.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

TABLE 1

| Capacitor | Aluminum formation film | | | Formation voltage | | | Occurrence of corrosion (%) |
|---|---|---|---|---|---|---|---|
| | Anode thickness (m) | Lead tab thickness (m) | Thickness ratio (%) (Lead tab/anode) | Voltage for anode (V) | Voltage for lead tab (V) | Voltage ratio (%) (Lead tab/anode) | |
| A1 | $3.5 \times 10^{-7}$ | $2.8 \times 10^{-7}$ | 80.0 | 250 | 200 | 80.0 | 0 |
| A2 | $5.6 \times 10^{-7}$ | $4.2 \times 10^{-7}$ | 75.0 | 400 | 300 | 75.0 | 0 |
| A3 | $6.3 \times 10^{-7}$ | $5.6 \times 10^{-7}$ | 88.9 | 450 | 400 | 88.9 | 0 |
| X1 | $3.5 \times 10^{-7}$ | $2.24 \times 10^{-7}$ | 64.0 | 250 | 160 | 64.0 | 52 |
| X2 | $5.6 \times 10^{-7}$ | $2.8 \times 10^{-7}$ | 50.0 | 400 | 200 | 50.0 | 63 |
| X3 | $6.3 \times 10^{-7}$ | $4.2 \times 10^{-7}$ | 66.7 | 450 | 300 | 66.7 | 48 |

TABLE 2

| Capacitor | Aluminum formation film | | | Formation voltage | | | LC (μA) |
|---|---|---|---|---|---|---|---|
| | Anode thickness (m) | Lead tab thickness (m) | Thickness ratio (%) (Lead tab/anode) | Voltage for anode (V) | Voltage for lead tab (V) | Voltage ratio (%) (Lead tab/anode) | |
| A1 | $3.5 \times 10^{-7}$ | $2.8 \times 10^{-7}$ | 80.0 | 250 | 200 | 80.0 | 7.5 |
| A2 | $5.6 \times 10^{-7}$ | $4.2 \times 10^{-7}$ | 75.0 | 400 | 300 | 75.0 | 4.2 |
| A3 | $6.3 \times 10^{-7}$ | $5.6 \times 10^{-7}$ | 88.9 | 450 | 400 | 88.9 | 3.8 |
| X1 | $3.5 \times 10^{-7}$ | $2.24 \times 10^{-7}$ | 64.0 | 250 | 160 | 64.0 | 107 |
| X2 | $5.6 \times 10^{-7}$ | $2.8 \times 10^{-7}$ | 50.0 | 400 | 200 | 50.0 | 131 |
| X3 | $6.3 \times 10^{-7}$ | $4.2 \times 10^{-7}$ | 66.7 | 450 | 300 | 66.7 | 92 |

What is claimed is:

1. A solid electrolytic capacitor, comprising:
a capacitor element comprising an anode made of a valve metal having an oxide film formed on a surface thereof, a cathode provided with a valve metal, and a separator provided between the anode and the cathode, the anode and the cathode and the separator being wound around together;
a solid electrolyte interposed between the anode and the cathode;
an anode lead tab having an oxide film formed on a surface thereof and being fixed to the anode; and
a cathode lead tab fixed to the cathode;
wherein the oxide film of the anode lead tab has a portion the thickness of which is equal to or greater than 75% but less than 100% of the thickness of the oxide film of the anode.

2. The solid electrolytic capacitor according to claim 1, wherein the solid electrolyte is a polythiophene-based conductive polymer, a polypyrrole-based conductive polymer, a polyaniline-based conductive polymer, or a TCNQ complex salt.

3. The solid electrolytic capacitor according to claim 2, wherein the solid electrolyte is a polythiophene-based conductive polymer.

4. The solid electrolytic capacitor according to claim 3, wherein the thickness of the oxide film of the anode is $3.5 \times 10^{-7}$ m or greater, and the oxide film of the anode lead tab has a portion the thickness of which is $2.8 \times 10^{-7}$ m or greater but less than $3.5 \times 10^{-7}$ m.

5. The solid electrolytic capacitor according to claim 4, wherein a portion of the oxide film of the anode lead tab has substantially the same thickness as the thickness of the oxide film of the anode.

6. The solid electrolytic capacitor according to claim 4, wherein the rated voltage is 50 V or higher.

7. The solid electrolytic capacitor according to claim 2, wherein the thickness of the oxide film of the anode is $3.5 \times 10^{-7}$ m or greater, and the oxide film of the anode lead tab has a portion the thickness of which is $2.8 \times 10^{-7}$ m or greater but less than $3.5 \times 10^{-7}$ m.

8. The solid electrolytic capacitor according to claim 7, wherein a portion of the oxide film of the anode lead tab has substantially the same thickness as the thickness of the oxide film of the anode.

9. The solid electrolytic capacitor according to claim 7, wherein the rated voltage is 50 V or higher.

10. The solid electrolytic capacitor according to claims 1, wherein the thickness of the oxide film of the anode is $3.5 \times 10^{-7}$ m or greater, and the oxide film of the anode lead tab has a portion the thickness of which is $2.8 \times 10^{-7}$ m or greater but less than $3.5 \times 10^{-7}$ m.

11. The solid electrolytic capacitor according to claim 10, wherein a portion of the oxide film of the anode lead tab has substantially the same thickness as the thickness of the oxide film of the anode.

12. The solid electrolytic capacitor according to claim 10, wherein the rated voltage is 50 V or higher.

* * * * *